United States Patent [19]

Rühl et al.

[11] 4,088,717
[45] May 9, 1978

[54] COOLING TOWER

[75] Inventors: Heinz Rühl, Bochum, Germany; Jean Gilbert, Nivelles, Belgium

[73] Assignee: GEA Kühturmbau und Systemtechnik Gesellschaft mit Beschränkter Haftung, Bochum, Germany

[21] Appl. No.: 770,935

[22] Filed: Feb. 22, 1977

Related U.S. Application Data

[63] Continuation of Ser. No. 598,157, Jul. 22, 1975, abandoned.

[30] Foreign Application Priority Data

Jul. 26, 1974 Germany ............................ 2436063

[51] Int. Cl.² .............................................. B01F 3/04
[52] U.S. Cl. ........................................ 261/109; 98/58; 98/70; 261/DIG. 11; 261/DIG. 77
[58] Field of Search .................................. 261/109–112, 261/DIG. 11, DIG. 77, 65; 55/248, 257 R; 165/DIG. 1; 98/58–60, 70, 79

[56] References Cited

U.S. PATENT DOCUMENTS

| 1,627,713 | 5/1927 | Seymour | 261/DIG. 11 |
|---|---|---|---|
| 1,747,288 | 2/1930 | Coffey | 261/DIG. 11 |
| 2,003,271 | 5/1935 | Beimann et al. | 261/111 |
| 2,181,338 | 11/1939 | Moran | 98/58 |
| 2,681,178 | 6/1954 | Mart | 261/DIG. 11 |
| 3,385,197 | 5/1968 | Greber | 261/DIG. 77 |
| 3,467,364 | 9/1969 | Zathureczky et al. | 261/DIG. 11 |
| 3,706,290 | 12/1972 | Holland | 98/58 X |
| 3,778,979 | 12/1973 | Friedling et al. | 55/248 X |
| 3,846,519 | 11/1974 | Spangemacher | 261/DIG. 11 |
| 3,990,870 | 11/1976 | Miczek | 261/109 X |

FOREIGN PATENT DOCUMENTS

| 773,397 | 11/1934 | France | 261/DIG. 77 |
|---|---|---|---|
| 967,440 | 11/1950 | France | 261/DIG. 11 |
| 542,261 | 1/1932 | Germany | 261/DIG. 11 |
| 250,416 | 1/1970 | U.S.S.R. | 261/DIG. 11 |
| 257,521 | 12/1970 | U.S.S.R. | 261/DIG. 11 |
| 136,252 | 12/1919 | United Kingdom | 98/58 |
| 489,918 | 8/1938 | United Kingdom | 261/DIG. 77 |
| 524,680 | 8/1940 | United Kingdom | 261/DIG. 11 |

Primary Examiner—Tim R. Miles
Assistant Examiner—Richard L. Chiesa
Attorney, Agent, or Firm—Michael J. Striker

[57] ABSTRACT

A cooling tower for condensing water has a hyperbolical main wall with an upper portion which defines a passage for ascending vapor-laden air. The upper portion contains an annular insert serving to intercept currents of cool air which develop and tend to flow into the interior of the intermediate portion of the main wall at low wind velocities and/or to intercept turbulent air which develops and tends to flow into the intermediate portion when the wind velocity at the top of the tower is high. The insert may constitute a sheltered passageway for workmen and may be made integral with the upper portion of the main wall. The width of the annular space which is defined by the insert and upper portion of the main wall may be a whole multiple of the depth of such space, and the cross-sectional area of this space can approach one-half the cross-sectional area of the passage through which cooling air escapes from the tower by flowing upwardly within and above the insert.

16 Claims, 4 Drawing Figures

COOLING TOWER

CROSS-REFERENCE TO RELATED APPLICATION

This application is a continuation of application Ser. No. 598,157 filed July 22, 1975 and now abandoned.

BACKGROUND OF THE INVENTION

The present invention relates to improvements in cooling towers for condensing water or the like. More particularly, the invention relates to improvements in natural-draft or mechanical-draft cooling towers of the type wherein the central vertical section of the main wall of the tower is preferably a hyperbola so that the upper region of the main wall acts not unlike a diffusor and promotes the flow of ascending air.

Cooling towers often reach a height of up to and in excess of 100 meters and, in some instances, a height of up to and in excess of 150 meters. The diameter may reach or exceed 50 meters, in some instances 120 meters. Their main wall is often made of concrete or analogous construction material and is disposed above a water-distributing system which sprinkles water into a basin whereby the streamlets of water are contacted by air which enters the lower portion of the main wall and flows upwardly. It is also known to construct such cooling towers for cross-flow of gaseous heat removing medium. The towers may be designed for natural draft or mechanical draft; in the latter instance, the fan or fans can be mounted at the top of or below the main wall, i.e., the towers can be operated with forced draft or induced draft. A hyperbolical main wall exhibits a number of important advantages in that it enhances the stability and contributes to lower cost of the cooling tower. However, in presently known cooling towers with hyperbolical main walls, the aerodynamic factor has been neglected so that such towers are not entirely satisfactory, especially in the region of the upper portion of the main wall.

The manner in which air flows in the region of the upper portion of the main wall exerts a pronounced influence on the mode of operation and efficiency of the tower. The nature of air flow at the upper portion depends largely on atmospheric conditions, especially on the velocity of wind at the crown of the tower. Thus, in the absence of any wind or when the velocity of wind is relatively low but the wind blows in several directions, thermal instability develops at the upper end of the main wall which brings about a rather pronounced downward flow of cool air in the region between the ascending column of cooling air which entrains water vapors into the atmosphere and the internal surface of the main wall. The inflowing cool air reduces the cross-sectional area (i.e., it constricts the ascending column of vapor-laden air so that the efficiency of the cooling tower decreases well below the maximum or average efficiency. This will be readily appreciated since such constriction of the ascending column of vapor-laden air increases its speed so that the length of intervals during which the ascending body of air is maintained in contact with water in the cooling tower is reduced well below the optimum length. The acceleration of ascending air takes place in the entire region where the relatively cool atmospheric air is allowed to penetrate into and to flow downwardly along the internal surface of the main wall. This means that once-cooled water must be recycled through the tower because the maximum temperature of water which can be reused in a plant or which can be released into rivers or ponds is prescribed in most industrial countries and is vigorously enforced by authorities. The main reason for the just discussed thermal instability in the region of the upper end of the main wall in a cooling tower wherein the main wall has a hyperbolical vertical sectional outline is that the pressure gradient of warmer air in the interior of the tower is less than the pressure gradient of surrounding atmospheric air.

When the wind velocity at the top of the cooling tower increases to a medium or high value, the likelihood of penetration of cool air along the internal surface of the main wall is less pronounced. However, the rapidly flowing air currents are turbulent, and pronounced complex tubulence in the passage which is provided for escape of vapor-laden columns of ascending air reduces the effective cross-sectional area of the columns. This brings about the same drawbacks as if cool air were permitted to descend along the inner side of the main wall.

SUMMARY OF THE INVENTION

An object of the invention is to provide a novel and improved natural-draft or mechanical-draft cooling tower which is constructed and assembled in such a way that the likelihood of penetration of cool or turbulent atmospheric air into the passage for evacuation of vapor-laden air is either prevented or reduced to a small fraction of penetration in heretofore known cooling towers.

Another object of the invention is to provide the cooling tower with a novel and improved main wall, especially as regards the aerodynamic characteristics of the upper portion where the column of air which has contacted the fluid to be cooled escapes from the column.

A further object of the invention is to provide a cooling tower, especially a wet cooling tower, with novel and improved means for insuring predictable outflow of ascending air at the upper end of a hyperbolical main wall.

An additional object of the invention is to provide a cooling tower which is better suited to operate with a high or optimum degree of efficiency irrespective of the direction, velocity and/or other characteristics of prevailing winds, than a conventional tower.

The invention is embodied in a cooling tower, particularly in a wet cooling tower for condenser water or the like which may be of the natural-draft or mechanical-draft type and the lower portion of which includes a water distributor system, one or more dry heat exchangers or both. The cooling tower comprises an upright annular main wall which is preferably hyperbolic (i.e., its cross-sectional outline in a central vertical plane preferably resembles a hyperbola) so that the upper section of the main wall constitutes a diffusor whose cross-sectional area increases in a direction above and away from the ground. The main wall has an air-admitting lower portion which is preferably located above a water basin and into which air enters through gaps between suitable supports for the main wall, an intermediate portion or chimney, and an upper portion which discharges heated and vapor-laden air into the atmosphere. In accordance with a feature of the invention, the tower comprises a substantially annular insert which is preferably located in the upper portion of the main wall and preferably defines therewith an annular space which is surrounded by the internal surface of the upper portion and is open at the top (i.e., it has an open upper side). Thus, the space permits the inflow of and thereby intercepts cool atmospheric air as well as tubulent air tending to penetrate into the intermediate portion of the main wall by flowing downwardly along the internal surface of the upper portion. The insert and the upper portion of the main wall may form an annular space which is bounded from the outer side and from below, a space which is bounded from within and from below, or a space which is bounded from within and from without as well as from below.

The novel features which are considered as characteristic of the invention are set forth in particular in the appended claims. The improved cooling tower itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
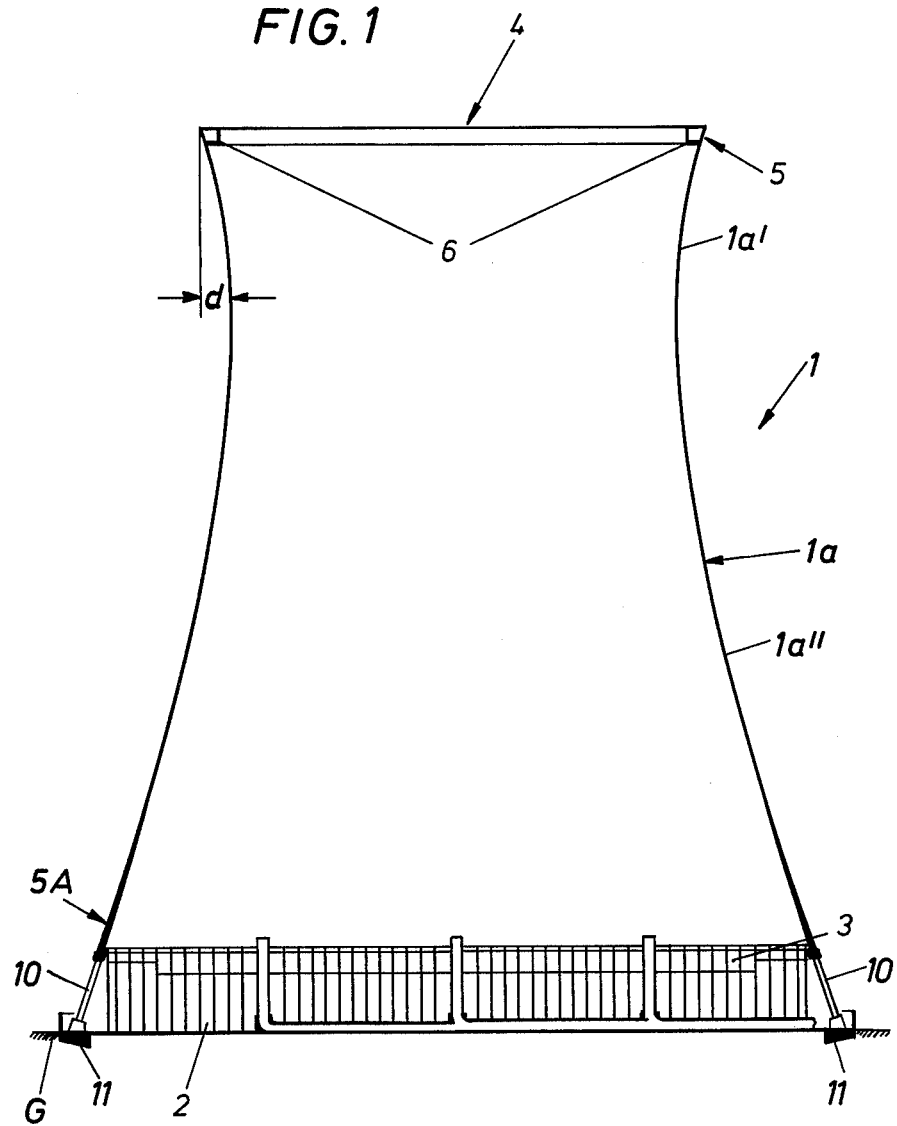
FIG. 1 is a schematic central vertical sectional view of a wet cooling tower with an insert which embodies one form of the invention.

FIG. 1 shows a natural-draft wet cooling tower which includes an annular main wall 1 having a hyperbolical outline. The main wall 1 constitutes a mantle or shell and has an intermediate portion or chimney 1a, an air-discharging upper portion or crown 5 and an air-admitting lower portion 5A resting on a system of supports 10. The supports 10 are mounted on foundations 11 which are embedded in the ground G. The cooling tower further comprises a water basin 2 and a distributing system 3 which sprinkles water into ascending streams of air which enter in the gaps between the supports 10. The main wall 1 may consist of relatively thin concrete or another rigid or substantially rigid material the minimum thickness of which may be in the range of 14 centimeters. The passage 4 through which air escapes from the main wall 1 of the tower is surrounded by a ring-shaped insert 6 best shown in FIG. 2. The insert 6 comprises a substantially cylindrical portion 8 which is spacedly surrounded by the internal surface 9 of the upper portion 5 of the main wall 1, and a substantially washer-like portion 8a which extends between the lower end of the cylindrical portion 8 and the upper portion 5. The portions 5, 8, 8a define an annular space 7 which is surrounded by the internal surface 9 and takes up a certain part of the area within the top portion 5. The cross-sectional area of passage 4 is substantially less than the combined cross-sectional area of passage 4 and the space 7. As a rule, the cross-sectional area of space 7 will not exceed 30 percent of the combined cross-sectional area of passage 4 plus space 7.

The insert 6 constitutes but one form of means which can be mounted on or inserted in the upper portion 5 to intercept at least some cool air as well as turbulent air tending to penetrate into the space within the intermediate portion 1a of the main wall 1. The illustrated insert 6 has an L-shaped cross-sectional outline; however, it is equally within the purview of the invention to configurate the insert in such a way that the portions surrounding the annular space will have a U-shaped cross-sectional outline. It is also possible to use an insert having a U-shaped cross-sectional outline and to bond the outer leg of the U to the upper portion 5 of the main wall. Such outer leg then constitutes a component part of the upper portion 5.

As shown in FIG. 1, the intermediate portion 1a of the main wall 1 has an upper part 1a' which diverges upwardly toward the upper portion 5, and a lower part 1a'' which diverges downwardly toward the lower portion 5A. The width y on the space 7, as measured radially of the upper portion 5, need not but preferably at least equals or exceeds the extent of divergence d of the upper part 1a'.

Figure 2:
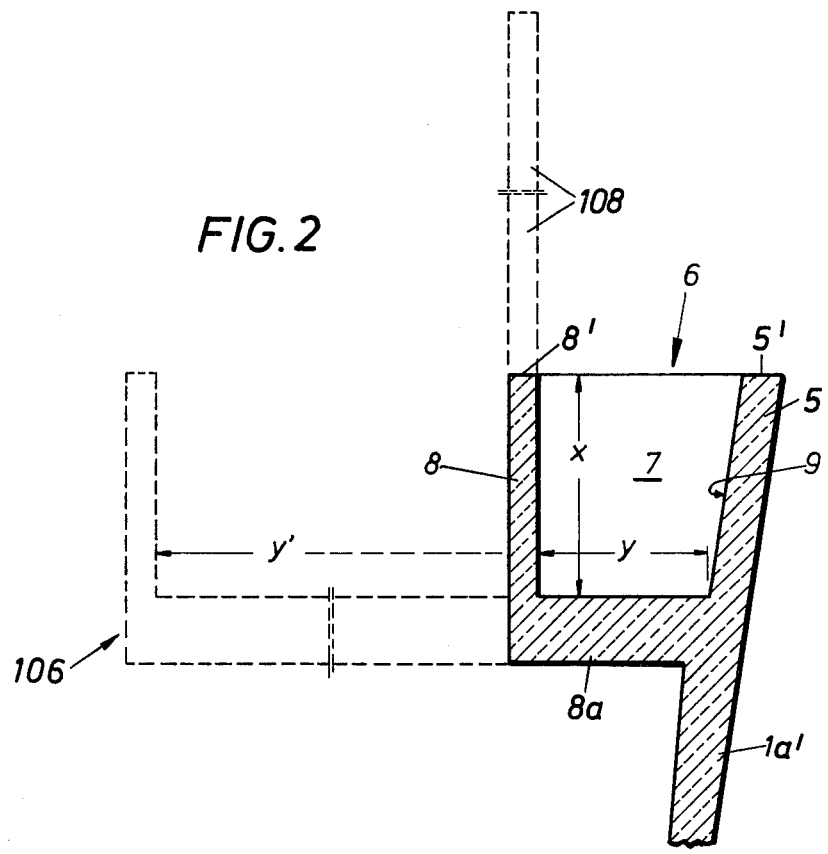
FIG. 2 is an enlarged detail view of the upper right-hand corner portion of the structure shown in FIG. 1, two modified inserts being indicated by broken lines.

In accordance with a modification, the length of the cylindrical portion 8 of the insert 6 shown in FIG. 2 can exceed, several times, the length of the upper portion 5, as considered in the axial direction of the cooling tower. In FIG. 2, the uppr end face 8' of the portion 8 is located at or close to the level of the upper end face 5' of the upper portion 5. In accordance with the just mentioned modification, the height of the ring-shaped portion 8 (indicated by broken lines, as at 108) can be 5x wherein x is the depth of space 7 or the length of upper portion 5. Such insert is even more effective as a baffle which directs cool and/or turbulent air upwardly and away from the intermediate portion 1a.

The width y of the space 7 (as considered radially of the upper portion 5) may equal or approximate the depth x. However, it is normally preferred to select the dimensions of the space 7 in such a way that the width y exceeds the depth x or vice versa; for example, the width y may equal 3x or x plus n wherein n does not exceed 2x.

This is indicated in FIG. 2 by broken lines wherein the width y' of a modified insert 106 equals or approximates 3x.

In each instance, the improved insert prevents cool air from flowing along the internal surface 9 of the upper portion 5 toward and into the interior of the intermediate portion 1a of the main wall 1. The prevention may be total or partial; however, the insert invariably intercepts substantial quantities of cool air and/or turbulent air. Such air is guided along the external surface of the portion 8 or 108 so that its direction changes. Air turbulence (which creates eddy currents tending to flow downwardly along the internal surface 9 of the upper portion 5) is likely to develop at medium or high wind velocities. Such eddy currents are also deflected by the ring-shaped portion 8 or 108 so that they cannot descend into the interior of the intermediate portion 1a. The hyperbolical outline of the main wall 1 enhances the efficiency of the cooling tower by promoting the upward flow of cooling air, even when the direction and/or velocity of wind changes within an extremely wide range.

It is clear that the inner diameter of the cylindrical portion 8 or 108 is selected with a view to insure that the passage 4 is large enough to allow for evacuation of vapor-laden air without undue acceleration irrespective of the velocity and/or direction of wind in the region of the upper portion 5a. Thus, the dimensioning of the passage 4 satisfies the thermodynamic requirements in spite of the fact that the diameter of the passage 4 is less than the diameter of the internal surface 9. By preventing the inflow of turbulent and/or cool air into the intermediate portion 1a, the improved insert insures that the temperature of air in the main wall 1 varies at a predictable rate. The cylindrical portion 8 or 108 acts not unlike a baffle which deflects the cold air streams and/or turbulent air so that such air flows upwardly rather than toward the interior of the intermediate portion 1a.

As mentioned above, the width $y$ or $y'$ of the annular space which the insert defines with the upper portion 5 of the main wall preferably exceeds the extent of divergence $d$ of the upper part 1a' of the intermediate wall portion 1a. As a rule, the cross-sectional area of the part 1a' immediately below the upper portion 5 exceeds the cross-sectional area of the intermediate wall 1a between the parts 1a' and 1a'' (i.e., at the lower end of the diffusor-like part 1a') by at least 10 percent and preferably by at least 15 percent. As also mentioned above, the cross-sectional area of the space 7 may equal up to 30 percent of the cross-sectional area of the space within the surface 9. In other words, the ratio of the cross-sectional area of space 7 to the effective cross-sectional area of the passage 4 may be as low as 3:7.

It has been found that the cost of making and installing the insert 6 (or of building a main wall wherein the insert is integral with the upper portion 5) is a very small fraction of the overall cost of the cooling tower. On the other hand, the advantages of the insert are so pronounced that, in the long run, its installation in the main wall greatly enhances the effectiveness and contributes to more predictable cooling action irrespective of the prevailing wind conditions. Thus, the improvement in aerodynamic conditions at the top of the main wall (without in any way affecting the stability of the tower and/or the ability of the intermediate portion of the main wall to act as a chimney if the tower is of the natural-draft type) invariably warrants the mounting of the insert not only in a newly erected cooling tower but also in existing cooling towers.

If the cooling tower is very large, e.g., if its maximum diameter exceeds 50 or 100 meters, the portion 8a of the insert can be used as the floor of a ring-shaped passageway for workmen. In all presently known cooling towers, the passageway is disposed around the upper portion of the main wall. This constitutes a potential danger to workmen, especially if the tower is a wet cooling tower or a combined wet-dry cooling tower. Thus, when the weather is cold, vapors which are entrained by ascending cooling air are condensed and form icicles which depend from and adhere to the external passageway. A workman is likely to slip which invariably results in serious injuries or death, especially if the height of the tower is in the range of several hundred feet. The improved insert renders the externally mounted passageways obsolete. Moreover, the insert is sufficiently close to ascending heated air so that the formation of icicles is unlikely or impossible.

In its simplest form, the improved insert merely consists of a washer, i.e., the cylindrical portion 8 or 108 shown in FIG. 2 is optional. The annular space which is adjacent to the internal surface of the upper portion is then open at the top and from within.

Figure 3:
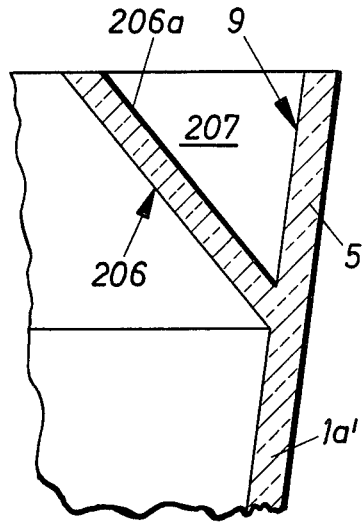
FIG. 3 is a view similar to that of FIG. 2 but showing a further insert.

FIG. 3 shows that the insert 206 may constitute the frustum of a hollow cone which is open at the top and bottom so that the space 207 acquires a substantially triangular cross-sectional shape. The external surface 206a of the insert 206 tapers inwardly and away from the internal surface 9 of the upper portion 5.

Figure 4:
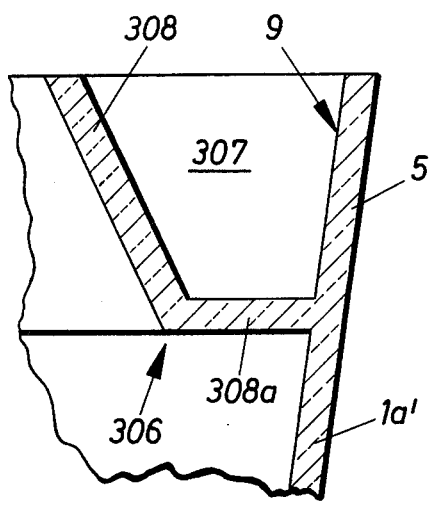
FIG. 4 is a view similar to that of FIG. 3 but showing still another insert.

FIG. 4 shows that the insert 306 has a portion 308 which is similar to the insert 206 of FIG. 3 and a washer-like portion 308a. The cross-sectional outline of the space 307 is a trapezoid.

As mentioned above, the invention can be embodied in wet cooling towers (such as the tower shown in FIG. 1), in combined wet-dry cooling towers, or in dry cooling towers.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A cooling tower comprising:
   an upright annular main wall of hyperbolic outline centered on an upright axis and having a downwardly diverging air-admitting lower portion, an upwardly diverging air-discharging upper portion having an upper edge and an internal surface, and an intermediate portion of substantially smaller diameter than said upper and lower portions and defining a relatively small flow cross section; and
   an insert in said upper portion immediately below said edge and above said intermediate portion, said insert comprising a solid annular wall extending radially inwardly from said internal surface toward said axis and axially upwardly at least to said upper edge, said insert defining at said upper portion a flow passage of greater flow cross section than said small cross section of said intermediate portion for air rising convectively axially within said main wall.

2. A cooling tower defined in claim 1, wherein said insert extends across up to 30 percent of the space bounded by said internal surface.

3. A cooling tower defined in claim 1, wherein said insert has a U-shaped cross-section and defines with said upper portion an upwardly open annular space.

4. A cooling tower defined in claim 1, wherein said insert has a substantially L-shaped cross-section and defines with said upper portion an upwardly open annular space.

5. A cooling tower defined in claim 1, wherein said insert is washer-shaped.

6. A cooling tower defined in claim 1, wherein said insert has an upwardly extending annular portion.

7. A cooling tower defined in claim 6, wherein said portion of said insert extends upwardly beyond said upper portion of said main wall.

8. A cooling tower defined in claim 7, wherein the height of said portion of said insert is a multiple of the height of said upper portion.

9. A cooling tower defined in claim 8, wherein the height of said portion of said insert exceeds the height of said upper portion up to five times.

10. A cooling tower defined in claim 1, wherein said insert defines with said upper portion an annular passageway for workmen.

11. A cooling tower defined in claim 1, wherein said insert defines with said upper portion an upwardly open annular space and has a width which greatly exceeds its depth.

12. A cooling tower defined in claim 11, wherein the width exceeds the depth up to three times.

13. A cooling tower defined in claim 1, wherein said insert has a frustoconical external surface which tapers upwardly and away from said internal surface.

14. A cooling tower defined in claim 1, wherein said tower is a natural-draft tower.

15. A cooling tower defined in claim 1, wherein said tower is a mechanical-draft tower.

16. A cooling tower defined in claim 1, wherein the maximum diameter and the height of said main wall exceed 50 meters.

* * * * *

UNITED STATES PATENT AND TRADEMARK OFFICE
CERTIFICATE OF CORRECTION

PATENT NO. : 4,088,717
DATED : May 9, 1978
INVENTOR(S) : Heinz Rühl et al.

It is certified that error appears in the above-identified patent and that said Letters Patent are hereby corrected as shown below:

[73] The names and addresses of the assignees should read:

GEA Kühlturmbau und Systemtechnik Gesellschaft mit Beschränkter Haftung, Bochum, Germany and Hamon-Sobelco S.A., Brussels, Belgium Signed and Sealed this Sixteenth Day of January 1979

[SEAL]

*Attest:*

RUTH C. MASON
*Attesting Officer*

DONALD W. BANNER
*Commissioner of Patents and Trademarks*